(12) United States Patent
Matsuoka

(10) Patent No.: US 9,285,025 B2
(45) Date of Patent: Mar. 15, 2016

(54) LOCK-UP DEVICE FOR TORQUE CONVERTER

(75) Inventor: Yoshihiro Matsuoka, Neyagawa (JP)

(73) Assignee: EXEDY Corporation, Osaka (JP)

( * ) Notice: Subject to any disclaimer, the term of this patent is extended or adjusted under 35 U.S.C. 154(b) by 18 days.

(21) Appl. No.: 14/116,212

(22) PCT Filed: Mar. 1, 2012

(86) PCT No.: PCT/JP2012/055257
§ 371 (c)(1),
(2), (4) Date: Nov. 7, 2013

(87) PCT Pub. No.: WO2012/169243
PCT Pub. Date: Dec. 13, 2012

(65) Prior Publication Data
US 2014/0076680 A1    Mar. 20, 2014

(30) Foreign Application Priority Data

Jun. 7, 2011 (JP) .................................. 2011-126965

(51) Int. Cl.
*F16H 45/02* (2006.01)
*F16D 47/06* (2006.01)
*F16H 45/00* (2006.01)

(52) U.S. Cl.
CPC ................ *F16H 45/02* (2013.01); *F16D 47/06* (2013.01); *F16H 2045/002* (2013.01); *F16H 2045/021* (2013.01); *F16H 2045/0278* (2013.01); *F16H 2045/0294* (2013.01)

(58) Field of Classification Search
CPC .............. F16H 45/02; F16H 2045/021; F16H 2021/0615
USPC .............. 192/3.28, 3.29, 3.3, 113.23, 113.24, 192/113.25, 113.26
See application file for complete search history.

(56) References Cited

U.S. PATENT DOCUMENTS

| 4,560,043 | A | 12/1985 | Murasugi et al. |
| 2008/0078638 | A1* | 4/2008 | Degler et al. ................... 192/3.3 |
| 2008/0083593 | A1* | 4/2008 | Huegel et al. ................. 192/3.29 |
| 2008/0121484 | A1 | 5/2008 | Degler |
| 2009/0139818 | A1* | 6/2009 | Ishikawa ................. F16H 45/02 192/3.29 |
| 2011/0120829 | A1* | 5/2011 | Vanni et al. ................... 192/3.29 |
| 2011/0240432 | A1* | 10/2011 | Takikawa et al. ............ 192/3.29 |
| 2014/0262666 | A1* | 9/2014 | Ushio et al. .................. 192/3.29 |

FOREIGN PATENT DOCUMENTS

| JP | 59-086750 A | 5/1984 |
| JP | 05-126229 A | 5/1993 |
| JP | 2005-344846 A | 12/2005 |

*Primary Examiner* — Richard Lorence
*Assistant Examiner* — Stacey Fluhart
(74) *Attorney, Agent, or Firm* — Global IP Counselors, LLP

(57) ABSTRACT

A lock-up device includes a piston, a clutch part, a first hydraulic chamber, a second hydraulic chamber, a first hydraulic port and a second hydraulic port. The first hydraulic chamber is formed between a front cover and the piston, and the operating oil for actuating the piston is supplied thereto. The second hydraulic chamber is formed independently from the first hydraulic chamber on the same side as the first hydraulic chamber with reference to the piston, and the operating oil for actuating the piston is supplied thereto. The first hydraulic port supplies the operating oil to the first hydraulic chamber. The second hydraulic port is provided independently from the first hydraulic port, and supplies the operating oil to the second hydraulic chamber.

10 Claims, 5 Drawing Sheets

LOCK-UP DEVICE FOR TORQUE CONVERTER

CROSS-REFERENCE TO THE RELATED APPLICATION

This U.S. national phase application claims priority to Japanese Patent Application No. 2011-126965 filed on Jun. 7, 2011. The entire disclosure of Japanese Patent Application No. 2011-126965 is hereby incorporated herein by reference

TECHNICAL FIELD

The present invention relates to a lock-up device, particularly to a lock-up device for a torque converter, which is disposed between a front cover and a turbine in order to transmit or cut torque.

BACKGROUND ART

A torque converter is a device for transmitting torque from an engine to a transmission through an operating fluid contained inside, and mainly includes: a front cover into which the torque from the engine is inputted; an impeller; a turbine; and a stator. The torque inputted into the front cover is outputted to the transmission through the impeller, operating oil and the turbine. The flow of the operating oil returning to the impeller from the turbine is regulated by the stator.

Further, torque converters are often equipped with a lock-up device disposed between the front cover and the turbine. For example, the lock-up device includes: a disc-shaped piston configured to be pressed onto the front cover; and a damper mechanism disposed between the piston and the turbine. The front cover and the turbine are configured to be mechanically coupled by the lock-up device, and thereby, torque is directly transmitted from the front cover to the turbine.

In such lock-up device, the piston has a friction member, which can be frictionally coupled to the front cover, on the outer peripheral part thereof. Further, the piston divides the space produced between the front cover and the turbine into a first hydraulic chamber on the front cover side and a second hydraulic chamber on the turbine side, and is axially movable by differential pressure between the first hydraulic chamber and the second hydraulic chamber (e.g., see PTL 1).

In the lock-up device, when the operating oil is drained from the first hydraulic chamber, the hydraulic pressure in the second hydraulic chamber becomes higher than that in the first hydraulic chamber, and the piston is moved towards the front cover. The friction member mounted to the piston is then pressed onto the front cover, and this produces a torque transmitted state that the clutch is engaged (clutch-on). On the other hand, when the operating oil is supplied to the first hydraulic chamber and the hydraulic pressure in the first hydraulic chamber becomes higher than that in the second hydraulic chamber, the friction member is moved towards the turbine and is separated away from the front cover. The clutch is thereby disengaged and this produces a state that transmission of torque is cut (clutch-off).

CITATION LIST

Patent Literature

PTL 1: Japan Laid-open Patent Application Publication No. JP-A-2005-344846

SUMMARY

Technical Problems

Incidentally, recent lock-up devices have a slip control function of enabling a friction coupling part of the piston to subtly slip in deceleration or at a speed less than or equal to that at which a lock-up (clutch-on) action is performed. Through performing of such slip control in the lock-up device, transmission efficiency can be enhanced and fuel consumption can be saved, and on the other hand, shocks can be relieved in the clutch-on action.

In a lock-up device having such slip control function, it is preferable to reduce the gradient of a characteristic of lock-up torque with respect to the hydraulic pressure of the operating oil (i.e., a characteristic representing a relation between hydraulic pressure variation and torque) in order to easily perform a slip control. This is because a torque control can be easily performed by a subtle hydraulic pressure control when lock-up torque is caused to vary less with respect to the hydraulic pressure of the operating oil. For example, in an example of FIG. 1, it can be concluded that the slip control performance of a characteristic A1 is better than that of a characteristic A2.

As described above, it is preferable to reduce the aforementioned gradient of the characteristic (hereinafter referred to as "torque/hydraulic-pressure-variation") in order to achieve a better slip control performance. However, when the torque/hydraulic-pressure-variation is reduced, the lock-up torque capacity of the lock-up device is inevitably reduced where the hydraulic pressure of the operating oil remains constant. Specifically, when the gradient of the characteristic A1 as the torque/hydraulic-pressure-variation is reduced in FIG. 1, torque (lock-up torque capacity) is reduced where the hydraulic pressure remains P. Thus, a better slip control performance cannot be achieved when the hydraulic pressure of the operating oil is reduced where the lock-up torque capacity is kept constant.

It is an object of the present invention to achieve a better slip control performance in the lock-up device, while a desired lock-up torque capacity can be reliably obtained, and simultaneously, the torque/hydraulic-pressure-variation can be suppressed.

Solution to Problems

A lock-up device for a torque converter according to a first aspect of the present invention is a device disposed between a front cover and a turbine in order to transmit or cut a torque, and includes a piston, a clutch part, a first hydraulic chamber, a second hydraulic chamber, a first hydraulic port and a second hydraulic port. The piston is disposed between the front cover and the turbine, and is axially slidable by hydraulic pressure. The clutch part is configured to allow or cut transmission of the torque between the front cover and the turbine by actuation of the piston. The first hydraulic chamber is formed between the front cover and the piston, and the operating oil for actuating the piston is supplied thereto. The second hydraulic chamber is formed independently from the first hydraulic chamber on the same side as the first hydraulic chamber with reference to the piston, and the operating oil for actuating the piston is supplied thereto. The first hydraulic port supplies the operating oil to the first hydraulic chamber. The second hydraulic port is provided independently from the first hydraulic port, and supplies the operating oil to the second hydraulic chamber.

As an example, it is herein given that the pressure receiving area of the piston in receiving the operating oil supplied to the first hydraulic chamber and that of the piston in receiving the operating oil supplied to the second hydraulic chamber are set to be equal, while the hydraulic pressure of the operating oil to be supplied to the first hydraulic chamber and that of the operating oil to be supplied to the second hydraulic chamber are set to be equal. Further, it is herein given that the clutch part has a specification whereby a torque T can be obtained with respect to a hydraulic pressure P.

In the aforementioned exemplary case, when the operating oil with the hydraulic pressure P is firstly supplied to the first hydraulic chamber through the first hydraulic port, the piston is moved in a clutch-on or clutch-off direction. Under the condition, a clutch torque T1 becomes T/2, because the pressure receiving area of the piston is half. In this case, the torque T/2 is obtained with respect to the hydraulic pressure P, and therefore, a torque/hydraulic-pressure-variation, i.e., a gradient becomes ½ of that in a case of a well-known device where the torque T is obtained with respect to the hydraulic pressure P (the characteristic A1 in FIG. 1).

Next, when the operating oil with the hydraulic pressure P is similarly supplied to the second hydraulic chamber through the second hydraulic port provided independently from the first hydraulic port, a clutch torque T2 to be obtained in supplying the operating oil to the second hydraulic chamber similarly becomes T/2, because the pressure receiving area of the piston is half. In this case, similarly to the aforementioned case, the torque T/2 is obtained with respect to the hydraulic pressure P, and therefore, the torque/hydraulic-pressure-variation, i.e., the gradient becomes ½ of that in the case of the well-known device where the torque T is obtained with respect to the hydraulic pressure P.

As described above, the torque T can be finally obtained with respect to the hydraulic pressure P. However, in the course of the above, the torque/hydraulic-pressure-variation becomes ½ of that in a case where a single hydraulic chamber is produced. Therefore, a desired lock-up torque capacity can be reliably obtained, while a better slip control performance can be achieved.

A lock-up device for a torque converter according to a second aspect of the present, invention relates to the lock-up device according to the first aspect, and wherein the first hydraulic chamber and the second hydraulic chamber are sealed except for portions thereof with which the first hydraulic port and the second hydraulic port are respectively communicated.

Here, the respective hydraulic chambers are sealed except for the hydraulic ports. Therefore, hydraulic circuits for actuating the piston can be structured as closed circuits. Accordingly, the piston can be reliably actuated, while the actuation speed of the piston can be increased.

A lock-up device for a torque converter according to a third aspect of the present invention relates to the lock-up device of the first or second aspect, and wherein the first hydraulic chamber is formed between the front cover and the piston. Moreover, the lock-up device further includes a compartment plate that is disposed within the first hydraulic chamber and forms the second hydraulic chamber between the compartment plate and the piston.

Here, the two hydraulic chambers are formed between the front cover and the piston. When the operating oil is supplied to these hydraulic chambers through the respective hydraulic ports, the piston is moved towards the turbine. Accordingly, the clutch is turned on or off.

A lock-up device for a torque converter according to a fourth aspect of the present invention relates to the lock-up device of the first or second aspect, and wherein the first hydraulic chamber is formed between the piston and the turbine. Moreover, the lock-up device further includes a compartment plate that is disposed within the first hydraulic chamber and forms the second hydraulic chamber between the compartment plate and the piston.

Here, the two hydraulic chambers are formed between the piston and the turbine. When the operating oil is supplied to these hydraulic chambers through the respective hydraulic ports, the piston is moved towards the front cover. Accordingly, the clutch is turned on or off.

A lock-up device for a torque converter according to a fifth aspect of the present invention relates to the lock-up device of the fourth aspect, and further includes a third hydraulic chamber, a third hydraulic port and a pressing member. The third hydraulic chamber is formed between the front cover and the piston, and the operating oil for actuating the piston is supplied thereto. The third hydraulic port supplies the operating oil to the third hydraulic chamber. The pressing member is disposed in the third hydraulic chamber, and presses the piston towards the clutch part.

Here, in a clutch-on state, the piston is being pressed onto the clutch part by the pressing force by the pressing member and the pressing force by the hydraulic pressure of the operating oil supplied to the third hydraulic chamber. Then, in a clutch-off state, the operating oil is drained from the third hydraulic chamber, while the operating oil is supplied independently to the first hydraulic chamber and the second hydraulic chamber. In this case, the hydraulic pressure of the operating oil to be supplied to the first hydraulic chamber and the second hydraulic chamber is required to have only a force resisting against the pressing force of the pressing member. Thus, the piston can be moved by a lower hydraulic pressure, and thereby, the clutch can be actuated (turned off).

A lock-up device for a torque converter according to a sixth aspect of the present invention relates to the lock-up device of any of the third to fifth aspects, and further includes a tubular member fixed to a turbine-side lateral surface of the front cover. Further, the piston is slidably supported by an outer peripheral surface of the tubular member, and the compartment plate is immovably fixed to the outer peripheral surface of the tubular member.

Here, when the operating oil is supplied to the first hydraulic chamber, the piston slides along the outer peripheral surface of the tubular member. Further, the compartment plate is immovably fixed to the tubular member. Therefore, when the operating oil is supplied to the second hydraulic chamber produced between the piston and the compartment plate, the piston slides along the outer peripheral surface of the tubular member in a direction away from the compartment plate.

A lock-up device for a torque converter according to a seventh aspect of the present invention relates to the lock-up device of the sixth aspect, and wherein the first hydraulic port and the second hydraulic port are formed in penetration through the tubular member from an inner peripheral side to an outer peripheral side.

A lock-up device for a torque converter according to an eighth aspect of the present invention relates to the lock-up device of any of the first to seventh aspects, and wherein the second hydraulic chamber is disposed on the further inner peripheral side than the clutch part.

DETAILED DESCRIPTION OF THE PREFERRED EMBODIMENTS

[First Exemplary Embodiment]

Figure 2:
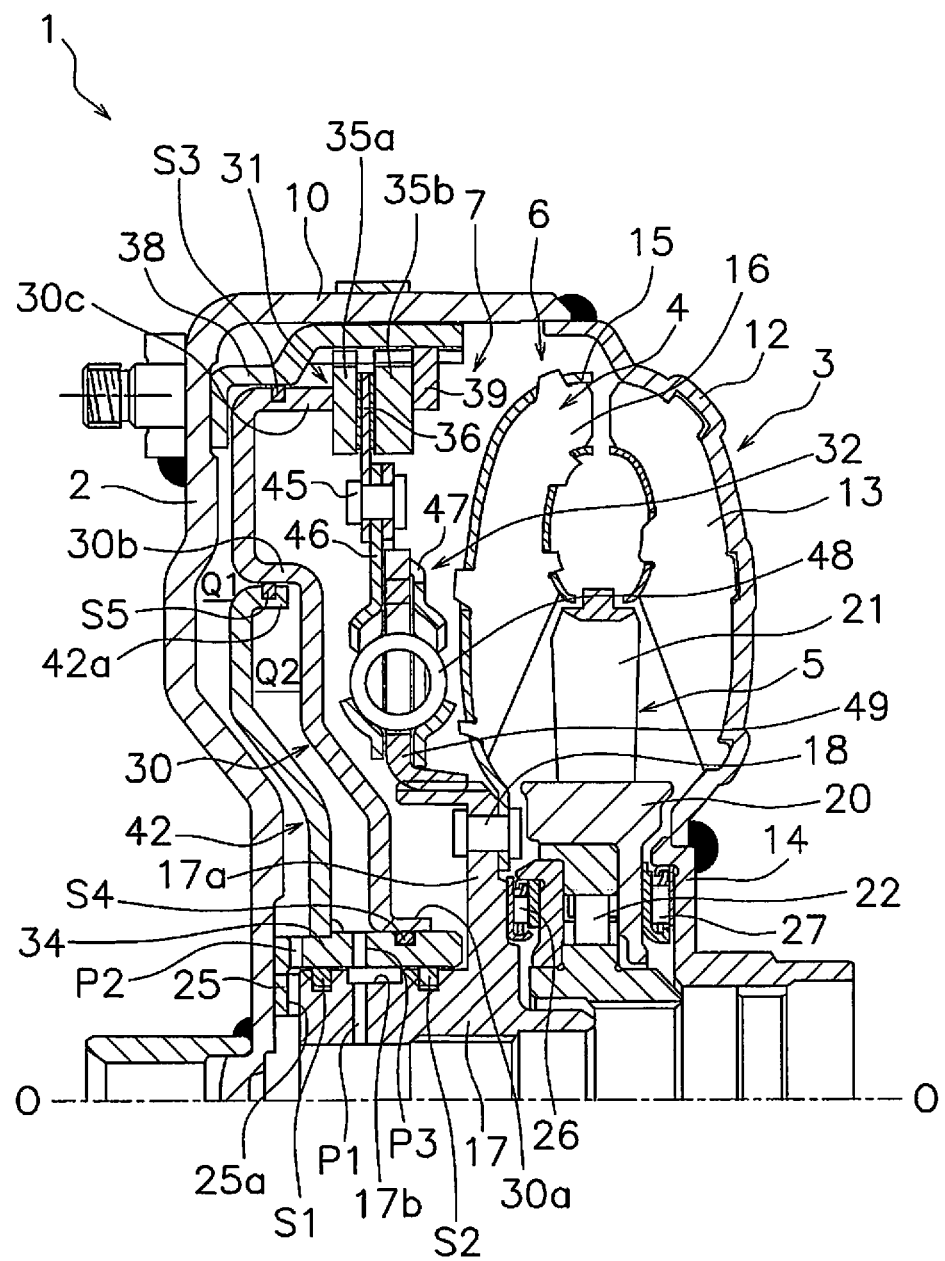
FIG. 2 is a cross-sectional structural view of a torque converter according to a first exemplary embodiment of the present invention.
Figure 3:
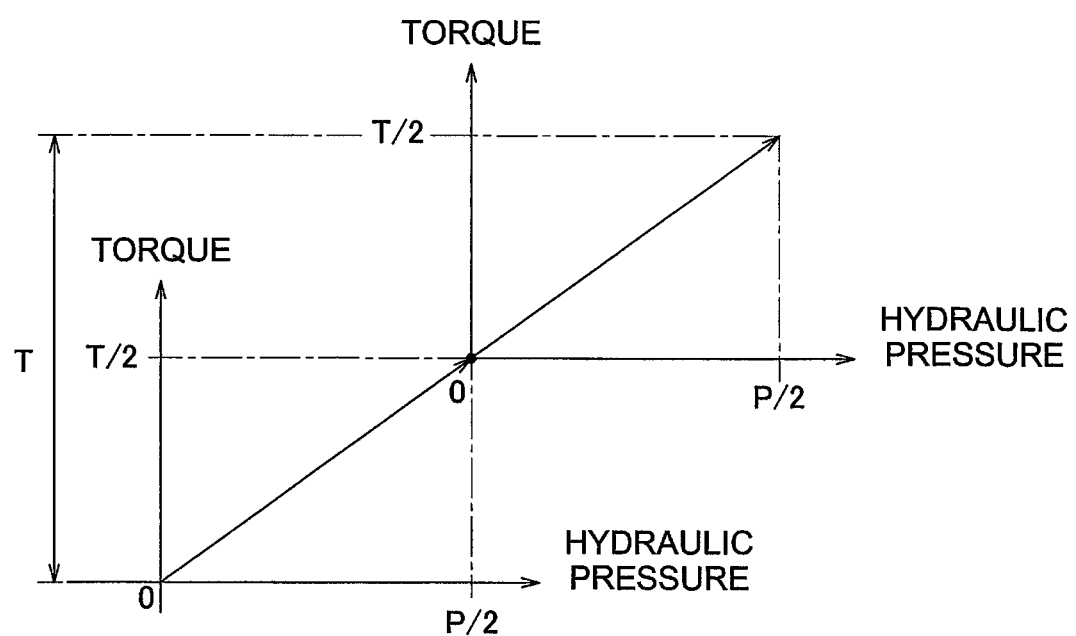
FIG. 3 is a chart that represents a relation between hydraulic pressure of operating oil and torque in order to explain an action of the present invention.

FIG. 2 is a partial cross-sectional view of a torque converter 1 employing a lock-up device as an exemplary embodiment of the present invention. In FIG. 2, an engine (not illustrated in the figure) is disposed on the left side, whereas a transmission (not illustrated in the figure) is disposed on the right side. A line O-O depicted in FIG. 2 indicates a rotary axis of the torque converter and the lock-up device.

[Entire Structure of Torque Converter]

The torque converter 1 is a device for transmitting torque from an engine-side crankshaft (not illustrated in the figures) to an input shaft of the transmission. The torque converter 1 includes: a front cover 2 fixed to an engine-side member; a torque converter main body 6 composed of three types of vane wheels (an impeller 3, a turbine 4 and a stator 5); and a lock-up device 7.

The front cover 2 is a disc-shaped member, and an outer peripheral tubular portion 10 is formed on the outer peripheral part of the front cover 2 while being protruding axially towards the transmission.

The impeller 3 includes: an impeller shell 12 fixed to the outer peripheral tubular portion 10 of the front cover 2 by welding; a plurality of impeller blades 13 fixed to the inside of the impeller shell 12; and a tubular impeller hub 14 fixed to the impeller shell 12 on the inner peripheral side by welding.

The turbine 4 is disposed in opposition to the impeller 3 within a fluid chamber. The turbine 4 includes: a turbine shell 15; a plurality of turbine blades 16 fixed to the turbine shell 15; and a turbine hub 17 fixed to the inner peripheral side of the turbine shell 15. The turbine hub 17 is formed in a tubular shape and has a disc-shaped flange 17a extending to the outer peripheral side. The inner peripheral part of the turbine shell 15 is fixed to the flange 17a by a plurality of rivets 18.

An annular groove 17b is formed on the outer peripheral surface of the turbine hub 17, while being disposed on the engine side of the flange 17a. Further, a first hydraulic port P1 is formed in the turbine hub 17 such that the annular groove 17b and the inner peripheral space of the turbine hub 17 are communicated with each other. It should be noted that the input shaft (not illustrated in the figures) of the transmission is spline-coupled to the inner peripheral part of the turbine hub 17.

The stator 5 is a mechanism disposed between the inner peripheral part of the impeller 3 and that of the turbine 4 in order to regulate the flow of operating oil returning to the impeller 3 from the turbine 4. The stator 5 mainly includes an annular stator carrier 20 and a plurality of stator blades 21 mounted to the outer peripheral surface of the stator carrier 20. The stator carrier 20 is supported by a stationary shaft (not illustrated in the figures) through a one-way clutch 22.

It should be noted that a thrust washer 25 is mounted axially between the front cover 2 and the turbine hub 17, whereas thrust bearings 26 and 27 are respectively mounted between the turbine hub 17 and the one-way clutch 22 and between the one-way clutch 22 and the impeller hub 14. A plurality of grooves 25a are formed on the transmission-side surface of the thrust washer 25 for allowing the inner peripheral side and the outer peripheral side to be communicated with each other.

[Lock-Up Device]

The lock-up device 7 is disposed in the space produced between the front cover 2 and the turbine 4. The lock-up device 7 includes a piston 30, a clutch part 31 and a damper mechanism 32. Further, the lock-up device 7 has a first hydraulic chamber Q1 and a second hydraulic chamber Q2 for actuating the piston 30.

Piston

The piston 30 is formed by an annular plate having a circular hole in the center part thereof. The piston 30 has: an inner peripheral tubular portion 30a formed by bending the inner peripheral end portion thereof towards the transmission; an intermediate tubular portion 30b formed by bending the radially intermediate portion thereof towards the engine; and an outer peripheral tubular portion 30c formed by bending the outer peripheral end portion thereof towards the transmission.

Further, a tubular support member 34 is fixed to the transmission-side surface of the front cover 2 such that the outer peripheral surface thereof is extending along the axial direction. The tubular support member 34 is disposed for covering the outer peripheral surface of the turbine hub 17. Further, the inner peripheral tubular portion 30a of the piston 30 is supported by the outer peripheral surface of the tubular support member 34, while being slidable in the axial direction. Further, two seal members S1 and S2 are mounted to the outer peripheral surface of the turbine hub 17, while being disposed on the axially both sides of the annular groove 17b. The annular groove 17b is thereby sealed.

Clutch Part

The clutch part 31 includes two drive plates 35a and 35b and a single driven plate 36. The respective plates 35a, 35b and 36 are formed in annular shapes.

The drive plates 35a and 35b are attached to a tubular collar 38 fixed to the front cover 2. Specifically, the collar 38 is fixed to the transmission-side surface of the front cover 2, and has a plurality of grooves formed on a part of the inner peripheral surface thereof. Further, a plurality of teeth are formed on the outer peripheral part of each drive plate 35a, 35b so as to be meshed with the plural grooves formed on the inner peripheral surface of the collar 38. With such structure, the drive plates 35a and 35b are axially movable with respect to and non-rotatable relatively to the collar 38 and the front cover 2.

Annular friction members are fixed to the both lateral surfaces of the outer peripheral part of the driven plate 36. In other words, the driven plate 36 has two friction surfaces. The inner peripheral part of the driven plate 36 is fixed to the damper mechanism 32, and thereby, the driven plate 36 is axially movable with the damper mechanism 32.

With the structure as described above, the tip end of the outer peripheral tubular portion 30c of the piston 30 is configured to be capable of pressing the drive plate 35a. Further, a backup ring 39 is mounted to the transmission side of the drive plate 35b. The backup ring 39 is fixed to the inner peripheral surface of the collar 38, while being axially immovable. Therefore, when the piston 30 is moved towards the transmission, the drive plates 35a and 35b and the driven plate 36 are configured to be press-contacted between the piston 30 and the backup ring 39.

Hydraulic Chamber

An annular compartment plate 42 is mounted between the front cover 2 and the piston 30. The inner peripheral end portion of the compartment plate 42 is fixed to the outer peripheral surface of the tubular support member 34 by welding. Further, the outer peripheral part of the compartment plate 42 is bent towards the transmission, and is formed as a seal tubular portion 42a.

A seal member S3 is mounted to the outer peripheral surface of the outer peripheral tubular portion 30c of the piston 30, and seals between the piston 30 and the collar 38. Further, a seal member S4 is mounted to the outer peripheral surface of the tubular support member 34, and seals between the tubular support member 34 and the piston 30. Yet further, a seal member S5 is mounted to the outer peripheral surface of the seal tubular portion 42a of the compartment plate 42, and seals between the compartment plate 42 and the intermediate tubular portion 30b of the piston 30.

With the structure as described above, the first hydraulic chamber Q1 is formed between the front cover 2 and the piston 30. Further, the second hydraulic chamber Q2 is formed between the compartment plate 42 and the piston 30. Yet further, both of the first hydraulic chamber Q1 and the second hydraulic chamber Q2 are sealed by the respective seal members S3 to S5, and hydraulic circuits for supplying the operating oil to the respective hydraulic chambers Q1 and Q2 are formed as closed circuits.

A second hydraulic port P2, penetrating in the radial direction, is bored through the engine-side end portion of the tubular support member 34 in roughly the same position as the grooves 25a of the thrust washer 25 in the axial direction. Further, a third hydraulic port P3, penetrating in the radial direction, is bored through the tubular support member 34 in a position outside the annular groove 17b of the turbine hub 17.

With the structure as described above, the operating oil is supplied to the first hydraulic chamber Q1 through the grooves 25a of the thrust washer 25 and the second hydraulic port P2. Further, the operating oil is supplied to the second hydraulic chamber Q2 through the first hydraulic port P1, the annular groove 17b and the third hydraulic port P3. It should be noted that in the present exemplary embodiment, a first pressure receiving area of the piston 30 for receiving the operating oil supplied to the first hydraulic chamber Q1 and a second pressure receiving area of the piston 30 for receiving the operating oil supplied to the second hydraulic chamber Q2 are set to be equal.

Damper Mechanism

The damper mechanism 32 includes: first and second output plates 46 and 47 that the outer peripheral parts thereof are fixed to each other by rivets 45; a plurality of torsion springs 48 supported by window holes bored through the both output plates 46 and 47; and an output flange 49. It should be noted that the inner peripheral end portion of the driven plate 36 is fixed to the both output plates 46 and 47 by the rivets 45. The output flange 49 has a plurality of window holes bored for accommodating the torsion springs 48. Further, a spline hole is formed in the inner peripheral part of the output flange 49, and is meshed with a spline shaft formed on the outer periphery of the flange 17a of the turbine hub 17 while being movable in the axial direction.

Actions

Clutch On

As an example, it is herein given that the hydraulic pressure of the operating oil to be supplied to the first hydraulic chamber Q1 and that of the operating oil to be supplied to the second hydraulic chamber Q2 are both set to P and the pressure receiving areas are both set to S/2. Further, it is given that in the clutch part 31, a torque T can be obtained per friction surface when the piston 30 receives the hydraulic pressure P with the entire surface thereof. Further, it is given that a required lock-up torque capacity is set to T.

When the engine speed is low and the vehicle speed is low, for instance, in starting moving of a vehicle, the operating oil is supplied to the first hydraulic chamber Q1 from a control valve (not illustrated in the figures) through the grooves 25a of the thrust washer 25 and the second hydraulic port P2. On the other hand, at this point of time, the operating oil is not supplied to the second hydraulic chamber Q2. The piston 30 is moved towards the turbine 4 by the operating oil supplied to the first hydraulic chamber Q1. The drive plates 35a and 35b and the driven plate 36 are thereby pressed in contact with each other between the piston 30 and the backup ring 39. Accordingly, a clutch-on state is produced.

It should be noted that at this point of time, the operating oil is not being supplied to the second hydraulic chamber Q2. Therefore, the piston 30 receives the hydraulic pressure of the operating oil with a part thereof located on the outer peripheral side of the compartment plate 42, and the pressure receiving area thereof is S/2. In other words, the pressing force of the piston 30 is less than that in such a configuration that the piston is moved by receiving the hydraulic pressure of the operating oil with its entirety as seen in a well-known lock-up device.

The number of friction surfaces possessed by the clutch part 31 is two, and therefore, a lock-up torque capacity T1 to be obtained in the clutch part 31 under the condition is set as follows.

$$T1 = \mu \times P \times S/2 \times r \times 2$$

μ: friction coefficient
r: effective radius of the friction member of the clutch part 31

After the first hydraulic chamber Q1 is filled with the operating oil as described above, the operating oil is supplied to the second hydraulic chamber Q2 from the control valve through the first port 1, the annular groove 17b and the third port P3 by another circuit provided independently from the circuit configured to supply the operating oil to the first hydraulic chamber Q1. Accordingly, the piston 30 is supposed to further press the drive plates 35a and 35b and the driven plate 36 towards the backup ring 39.

In this case, similarly to the above, a lock-up torque capacity T2 to be obtained by the operating oil supplied to the second hydraulic chamber Q2 is set as follows.

$$T2 = \mu \times P \times S/2 \times r \times 2$$

Consequently, when the operating oil with the hydraulic pressure P is supplied to the both hydraulic chambers Q1 and Q2, a lock-up torque capacity (T1+T2) is obtained.

The torque capacity (T1+T2) corresponds to 2T, where the aforementioned condition "a torque T can be obtained per friction surface when the piston 30 receives the hydraulic pressure P with the entire surface thereof" is assumed. On the other hand, the required lock-up torque capacity is T.

In view of the above, the hydraulic pressure of the operating oil to be supplied to the hydraulic chamber Q1 and that to be supplied to the hydraulic chamber Q2 are both set to P/2 in the present exemplary embodiment.

Variation in the clutch torque with respect to the hydraulic pressure of the operating oil in the aforementioned configuration can be represented with such a chart as shown in FIG.

Figure 1:
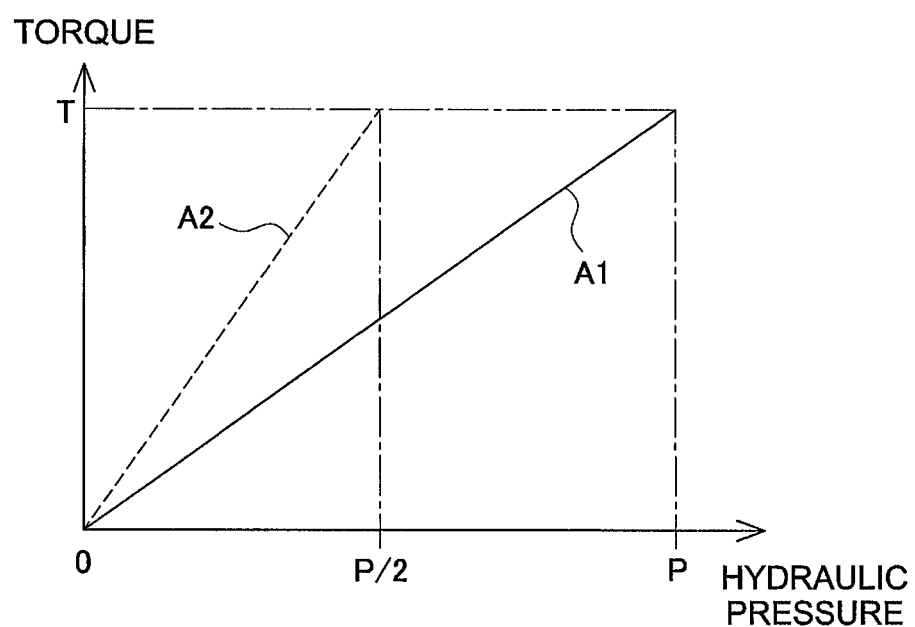
FIG. 1 is a chart representing a relation between hydraulic pressure of operating oil and torque.

3. In this case, the load of the hydraulic pump is P/2, and the capacity T can be obtained as the clutch torque. Further, a variation rate of torque with respect to hydraulic pressure (gradient of characteristic) is the same as the characteristic A1 in FIG. 1. The load of the hydraulic pump can be reduced without increasing the gradient of characteristic.

Clutch Off

When the vehicle speed is increased, the operating oil is drained from the first hydraulic chamber Q1 and the second hydraulic chamber Q2. Further, the pressure of the operating oil on the turbine side of the piston 30 is controlled to be higher. The piston 30 is thereby moved towards the engine, and the respective plates 35a, 35b and 36 of the clutch part 31 are separated away from each other. Accordingly, a clutch-off state is produced.

Features

In the present exemplary embodiment, the load of the hydraulic pump can be reduced without changing the variation rate of torque with respect to the hydraulic pressure of the operating oil. Therefore, saving of fuel consumption can be achieved without deteriorating the slip control performance.

Further, the respective hydraulic chambers Q1 and Q2 are sealed, and the hydraulic circuits for actuating the piston 30 are structured as closed circuits. Therefore, the piston 30 can be reliably actuated, and the actuation speed of the piston 30 can be increased.

—Second Exemplary Embodiment—

Figure 4:
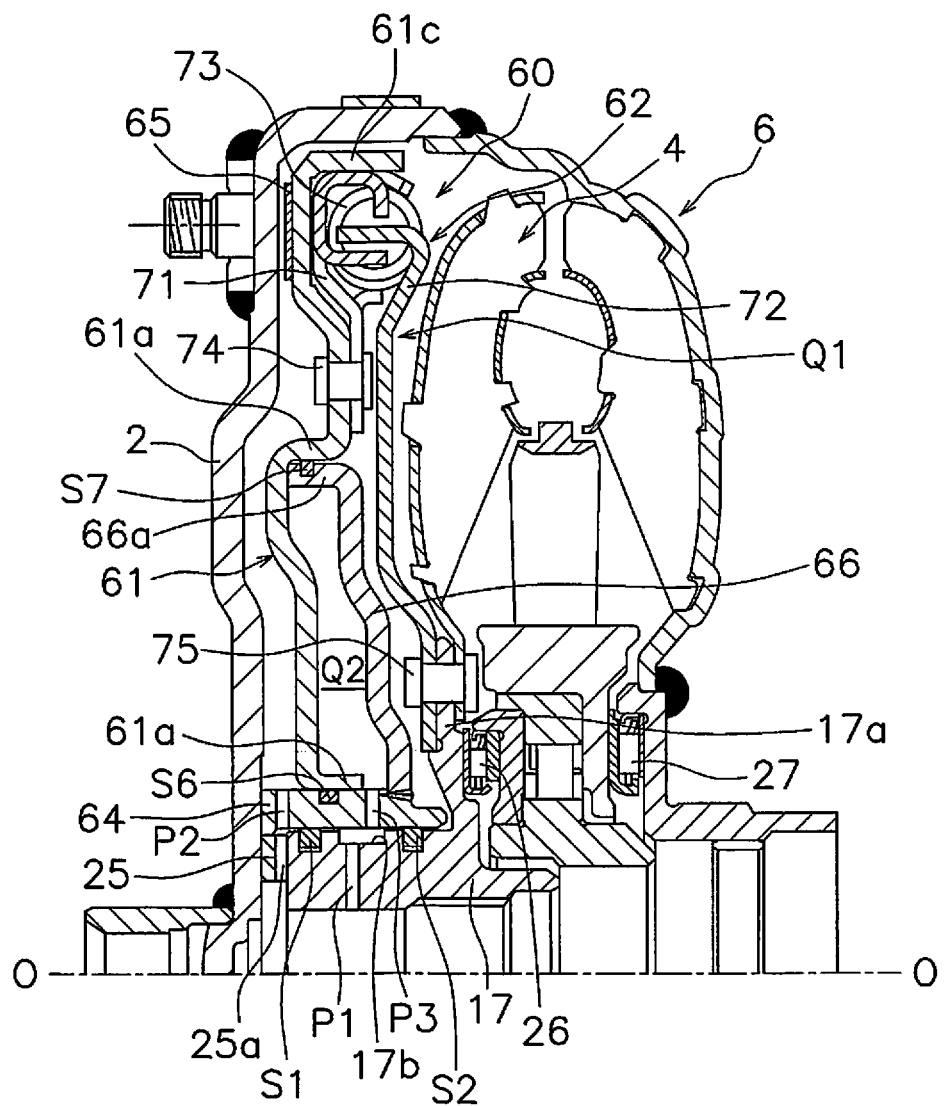
FIG. 4 is a cross-sectional structural view of a torque converter according to a second exemplary embodiment of the present invention.

FIG. 4 illustrates a lock-up device according to a second exemplary embodiment of the present invention. It should be noted that in the second exemplary embodiment, the same reference signs are assigned to elements similar to those in the first exemplary embodiment. Further, the torque converter main body 6 also has completely the same structure as that in the first exemplary embodiment. Therefore, explanation will not be made for the elements similar to those in the first exemplary embodiment.

Lock-Up Device

A lock-up device 60 includes a piston 61 and a damper mechanism 62. Further, the lock-up device 60 has the first hydraulic chamber Q1 and the second hydraulic chamber Q2 for actuating the piston 61.

Piston

The piston 61 is formed by an annular plate having a circular hole in the center part thereof. The piston 61 has: an inner peripheral tubular portion 61a formed by bending the inner peripheral end portion thereof towards the transmission; an intermediate tubular portion 61b formed by bending the radially intermediate portion thereof towards the transmission; and an outer peripheral tubular portion 61c formed by bending the outer peripheral end portion thereof towards the transmission. Further, a tubular support member 64 is fixed to the transmission-side surface of the front cover 2, while the outer peripheral surface thereof is extending along the axial direction. The inner peripheral tubular portion 61a of the piston 61 is supported by the outer peripheral surface of the tubular support member 64, while being slidable in the axial direction. Similarly to the above, the hydraulic ports P2 and P3 are formed in the tubular member 64.

Further, a friction member 65 is fixed to the outer peripheral part of the piston 61 so as to serve as a clutch part to be pressed in contact with the lateral surface of the outer peripheral part of the front cover 2. The friction member 65 is formed in an annular shape.

Hydraulic Chamber

An annular compartment plate 66 is mounted between the piston 61 and the turbine 4. The inner peripheral end portion of the compartment plate 66 is fixed to the outer peripheral surface of the tubular support member 64 by welding. Further, the outer peripheral part of the compartment plate 66 is bent towards the engine, and is formed as a seal tubular portion 66a.

A seal member S6 is mounted to the outer peripheral surface of the tubular support member 64, and seals between the tubular support member 64 and the piston 61. Further, a seal member S7 is mounted to the outer peripheral surface of the seal tubular portion 66a of the compartment plate 66, and seals between the compartment plate 66 and the intermediate tubular portion 61b of the piston 61.

With the structure as described above, the first hydraulic chamber Q1 is formed on the turbine-4 side of the piston 61. Further, the second hydraulic chamber Q2 is formed between the compartment plate 66 and the piston 61.

Here, the operating oil is supplied to the first hydraulic chamber Q1 through any of the paths in which the thrust bearings 26 and 27 are disposed. Further, the operating oil is supplied to the second hydraulic chamber Q2 through the first port P1, the annular groove 17b and the third port P3.

Damper Mechanism

The damper mechanism 62 is disposed between the piston 61 and the turbine 4. The damper mechanism 62 includes an input plate 71, an output plate 72 and a plurality of torsion springs 73 coupling the both plates 71 and 72.

The input plate 71 is formed in an annular shape and the inner peripheral end portion thereof is fixed to the turbine-side surface of the piston 61 by rivets 74. Further, a plurality of accommodation portions are formed in the outer peripheral part of the input plate 71 in order to accommodate the plural torsion springs 73.

The output plate 72 is formed in a disc shape having a hole in the center part thereof. The inner peripheral end portion of the output plate 72 is fixed to the flange portion 17a of the turbine hub 17 by rivets 75. Further, engaging portions are formed in the outer peripheral part of the output plate 72 so as to be engaged with the both end portions of the torsion springs 73.

Action

Clutch On

When the engine speed is low and the vehicle speed is low, for instance, in starting moving of a vehicle, the operating oil is supplied to the first hydraulic chamber Q1 from the control valve (not illustrated in the figures) through the path in which either the thrust bearing 26 or the thrust bearing 27 is disposed. On the other hand, the operating oil is drained from the space produced between the front cover 2 and the piston 61. The piston 61 is moved towards the front cover 2 by the operating oil supplied to the first hydraulic chamber Q1. The friction member 65 is thereby pressed onto the front cover 2. Accordingly, the clutch-on state is produced.

It should be noted that at this point of time, the operating oil is not being supplied to the second hydraulic chamber Q2. Therefore, the piston 61 receives the hydraulic pressure of the operating oil with a part thereof located on the outer peripheral side of the compartment plate 66. In other words, the pressing force of the piston 61 is less than that in such a configuration that the piston is moved by receiving the hydraulic pressure of the operating oil with its entirety as seen in a well-known lock-up device.

After the first hydraulic chamber Q1 is filled with the operating oil as described above, the operating oil is supplied to the second hydraulic chamber Q2 from the control valve through the first port P1, the annular groove 17b and the third port P3 by another circuit provided independently from the circuit configured to supply the operating oil to the first hydraulic chamber Q1. Accordingly, the piston 61 is further moved towards the front cover 2.

In the present second exemplary embodiment, where the piston pressure receiving areas relevant to the two hydraulic chambers Q1 and Q2 are the same, the torque capacity at the hydraulic pressure P will be T/2 in supplying the operating oil to the first hydraulic chamber Q1 and the second hydraulic chamber Q2, respectively. Thus, the torque/hydraulic-pressure-variation can be ½ of that of a well-known device. In addition, the final torque capacity will be T.

Clutch Off When the vehicle speed is increased, the operating oil is drained from the second hydraulic chamber Q2. Further, the operating oil is supplied to the space produced between the front cover 2 and the piston 61 through the grooves 25a of the thrust washer 25 and the second port P2. The piston 61 is thereby moved towards the transmission, and the friction member 65 is separated away from the front cover 2. Accordingly, the clutch-off state is produced.

—Third Exemplary Embodiment—

Figure 5:
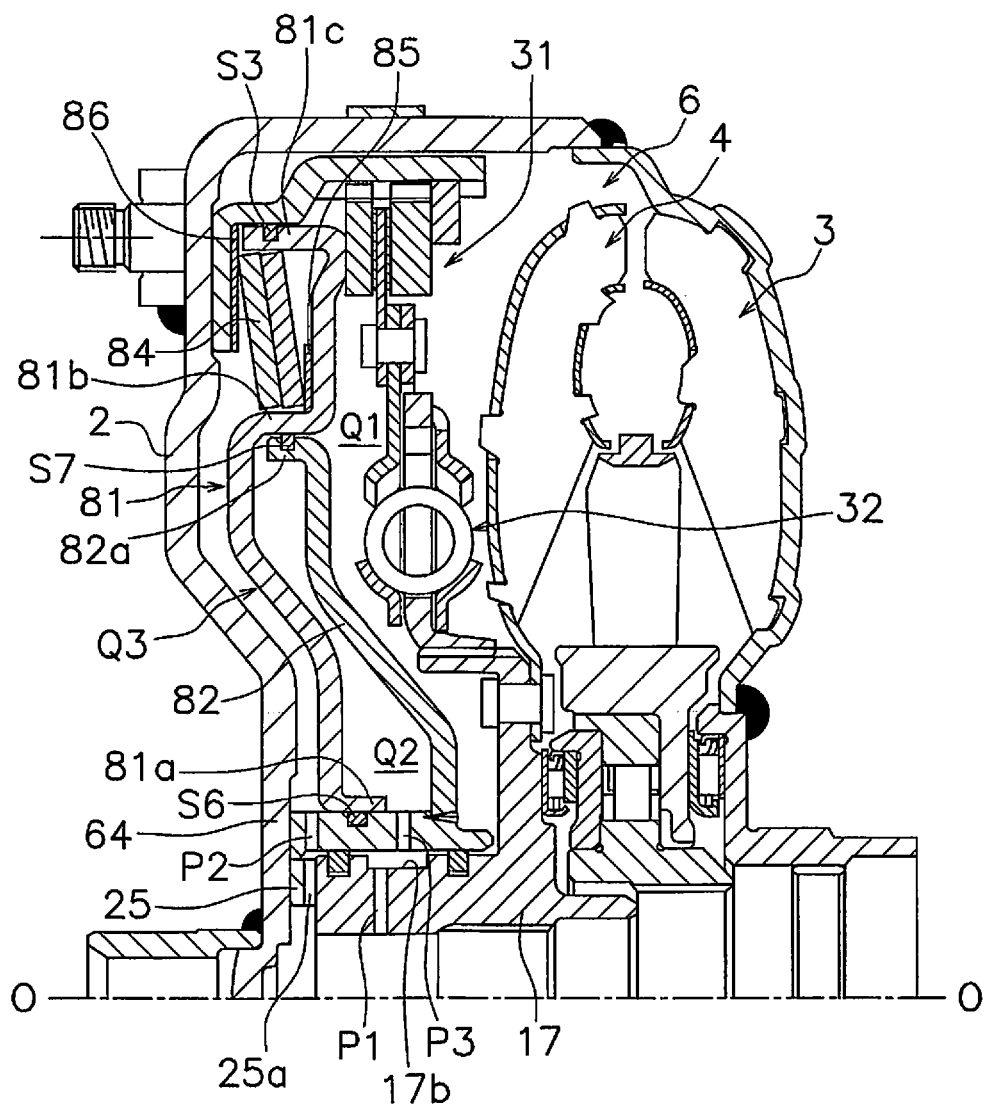
FIG. 5 is a cross-sectional structural view of a torque converter according to a third exemplary embodiment of the present invention.

FIG. 5 illustrates a lock-up device according to a third exemplary embodiment of the present invention. It should be noted that in the third exemplary embodiment, the same reference signs are assigned to elements similar to those in the first exemplary embodiment. Further, the torque converter main body 6 has completely the same structure as that in the first exemplary embodiment. Therefore, explanation will not be made for the elements similar to those in the first exemplary embodiment.

Lock-Up Device

A lock-up device 80 is disposed in the space produced between the front cover 2 and the turbine 4. The lock-up device 80 includes a piston 81, the clutch part 31 and the damper mechanism 32. Further, the lock-up device 80 has the first hydraulic chamber Q1 and the second hydraulic chamber Q2 for actuating the piston 81. The clutch part 31 and the damper mechanism 32 are structured similarly to those in the first exemplary embodiment, and therefore, the explanation thereof will not be made.

Piston

The piston 81 is formed by an annular plate having a circular hole in the center part thereof. The piston 81 has: an inner peripheral tubular portion 81a formed by bending the inner peripheral end portion thereof to the transmission; an intermediate tubular portion 81b formed by bending the radially intermediate portion thereof to the transmission; and an outer peripheral tubular portion 81c formed by bending the outer peripheral end thereof to the engine. Further, the tubular support member 64 is fixed to the transmission-side surface of the front cover 2, while the outer peripheral surface thereof is extending along the axial direction. The inner peripheral tubular portion 81a is supported by the outer peripheral surface of the tubular support member 64, while being slidable in the axial direction. The tubular support member 64 has completely the same structure as that in the second exemplary embodiment.

Hydraulic Chamber

A compartment plate 82 is mounted between the piston 81 and the turbine 4. The basic structure of the compartment plate 82 is similar to the compartment plate in the second exemplary embodiment, although the specific shape thereof is different from the compartment plate in the second exemplary embodiment. Specifically, the compartment plate 82 is formed in an annular shape, and the inner peripheral end portion thereof is fixed to the outer peripheral surface of the tubular support member 64 by welding. Further, the outer peripheral portion thereof is bent towards the engine, and is formed as a seal tubular portion 82a.

The first hydraulic chamber Q1 is formed on the turbine side of the piston 81. Further, the seal member S6 is mounted to the outer peripheral surface of the tubular support member 64, and seals between the tubular support member 64 and the piston 81. On the other hand, the seal member S7 is mounted to the outer peripheral surface of the seal tubular portion 82a of the compartment plate 82, and seals between the compartment plate 82 and the intermediate tubular portion 81b of the piston 81. Thus, the second hydraulic chamber Q2 is formed between the compartment plate 82 and the piston 81.

Further, similarly to the first exemplary embodiment, the seal member S3 is mounted to the outer peripheral tubular portion 81c of the piston 81. Thus, a third hydraulic chamber Q3 is formed between the front cover 2 and the piston 81.

Here, the operating oil is supplied to the first hydraulic chamber Q1 through either of the path in which the thrust bearing 26 is disposed and the path in which the thrust bearing 27 is disposed. Further, the operating oil is supplied to the second hydraulic chamber Q2 through the first port P1, the annular groove 17b and the third port P3. Yet further, the operating oil can be supplied to the third hydraulic chamber Q3 through the grooves 25a of the thrust washer 25 and the second port P2.

Pressing Member

In the present third exemplary embodiment, a pressing member 84 is mounted between the piston 81 and the front cover 2 (when accurately described, a part of the collar 38) in order to press the piston 81 towards the clutch part 31. The pressing member 84 is composed of two cone springs, and presses the piston 81 with the inner peripheral end portion thereof while pressing the front cover 2 with the outer peripheral end portion thereof through a part of the collar 38. Therefore, as illustrated in FIG. 5, when the piston 81 is set and the hydraulic pressure of the operating oil is not acting on the respective elements, the piston 81 presses the clutch part 31, and accordingly, a clutch-on state is produced.

It should be noted that a protective plate 85 is disposed between the piston 81 and the inner peripheral end portion of one cone spring 84, while a protective plate 86 is disposed between the collar 38 and the outer peripheral end portion of the other cone spring 84.

Action

Clutch On

When the engine speed is low and the vehicle speed is low, for instance, in starting moving of a vehicle, the operating oil is not being supplied to the respective hydraulic chambers Q1 and Q2. Therefore, the piston 81 presses the clutch part 31 by the pressing force of the cone springs 84. Accordingly, a clutch-on state is produced.

Clutch Off

When the vehicle speed is increased to a predetermined speed or greater, the operating oil is supplied to the first hydraulic chamber Q1 from the control valve (not illustrated in the figures) through the path in which either the thrust bearing 26 or the thrust bearing 27 is disposed. It should be noted at this point of time, the operating oil is not supplied to the second hydraulic chamber Q2. The piston 81 receives front-cover-2 directional force from the operating oil supplied to the first hydraulic chamber Q1. In the present exemplary embodiment, the hydraulic pressure of the operating oil to be supplied to the first hydraulic chamber Q1 is P/2, and the pressing force acting on the clutch part 31 of the piston 81 is reduced. Accordingly, a half clutch state is produced. Subsequently, the operating oil is supplied to the second hydraulic chamber Q2 from the control valve through the first port P1, the annular groove 17b and the third port P3 by another circuit provided independently from the circuit configured to supply the operating oil to the first hydraulic chamber Q1. The piston 81 is thereby moved towards the front cover 2 against the pressing force of the cone springs 84. Accordingly, the clutch is reliably turned off.

In the present exemplary embodiment, it is possible to achieve advantageous effects similarly to those achieved by the first exemplary embodiment.

Other Example of Clutch On

It should be noted that the pressing force of the operating oil can be applied by supplying the operating oil to the third hydraulic chamber Q3 in the clutch-on state. In this case, the pressing force of the cone springs 84 can be reduced, and design flexibility can be enhanced.

Other Exemplary Embodiments

The present invention is not limited to the exemplary embodiments as described above, and a variety of changes or modifications can be made without departing from the scope of the present invention.

In the aforementioned respective exemplary embodiments, the operating oil with the hydraulic pressure P/2 is configured to be supplied to each of the first hydraulic chamber Q1 and the second hydraulic chamber Q2. However, the operating oil may be configured to be supplied at different pressures to the respective chambers. Further, unlike the aforementioned respective exemplary embodiments, the hydraulic pressures supplied to the respective hydraulic chambers are also not required to exert the same pressing force of or the same pressing-release force of the piston, and may be configured to exert different forces (torques).

INDUSTRIAL APPLICABILITY

According to the lock-up device of the present invention, a better slip control performance can be achieved, while a desired lock-up torque capacity can be reliably obtained, and simultaneously, torque/hydraulic-pressure-variation can be suppressed.

ADVANTAGEOUS EFFECTS OF INVENTION

According to the present invention as described above, in the lock-up device, a better slip control performance can be achieved, while a desired lock-up torque capacity can be reliably achieved, and simultaneously, torque/hydraulic-pressure-variation can be suppressed.

The invention claimed is:

1. A lock-up device for a torque converter, the lock-up device being disposed between a front cover and a turbine in order to transmit and cut a torque, the lock-up device comprising:
    a piston being disposed between the front cover and the turbine, the piston being axially slidable by operating oil;
    a clutch part being configured to allow or cut transmitting the torque between the front cover and the turbine by actuating the piston;
    a first hydraulic chamber to which the operating oil for actuating the piston is supplied;
    a second hydraulic chamber to which the operating oil for actuating the piston is supplied, the second hydraulic chamber being formed independently from the first hydraulic chamber on the same side as the first hydraulic chamber with reference to the piston, the second hydraulic chamber not being in direct fluid communication with the first hydraulic chamber;
    a first hydraulic port being disposed to supply the operating oil to the first hydraulic chamber; and
    a second hydraulic port being disposed to supply the operating oil to the second hydraulic chamber, the second hydraulic port being provided independently from the first hydraulic port,
    the first hydraulic chamber being configured between the piston and the turbine, the lock-up device further including a compartment plate disposed within the first hydraulic chamber, the compartment plate forming the second hydraulic chamber between the compartment plate and the piston.

2. The lock-up device for the torque converter recited in claim 1, wherein
    the first hydraulic chamber and the second hydraulic chamber are sealed except for portions thereof with which the first hydraulic port extends to the second hydraulic port.

3. The lock-up device for the torque converter recited in claim 1, further comprising
    a third hydraulic chamber to which the operating oil for actuating the piston is supplied, the third hydraulic chamber being configured between the front cover and the piston;
    a third hydraulic port being disposed to supply the operating oil to the third hydraulic chamber; and
    a pressing member being disposed to press the piston towards the clutch part, the pressing member being disposed in the third hydraulic chamber.

4. The lock-up device for the torque converter recited in claim 1, further comprising
    a tubular member being fixed to a turbine-side lateral surface of the front cover, wherein
    the piston is slidably supported by an outer peripheral surface of the tubular member, and
    the compartment plate is immovably fixed to the outer peripheral surface of the tubular member.

5. The lock-up device for the torque converter recited in claim 4, wherein
    the first hydraulic port and the second hydraulic port are holes from an inner peripheral side to an outer peripheral side of the tubular member.

6. The lock-up device for the torque converter recited in claim 1, wherein
    the second hydraulic chamber is disposed on an inner peripheral side than the clutch part.

7. A lock-up device for a torque converter, the lock-up device being disposed between a front cover and a turbine in order to transmit and cut a torque, the lock-up device comprising:
    a piston being disposed between the front cover and the turbine, the piston being axially slidable by operating oil;
    a clutch part being configured to allow or cut transmitting the torque between the front cover and the turbine by actuating the piston;
    a first hydraulic chamber to which the operating oil for actuating the piston is supplied;
    a second hydraulic chamber to which the operating oil for actuating the piston is supplied, the second hydraulic chamber being formed independently from the first hydraulic chamber on the same side as the first hydraulic chamber with reference to the piston, the second hydraulic chamber not being in direct fluid communication with the first hydraulic chamber;
    a first hydraulic port being disposed to supply the operating oil to the first hydraulic chamber;

a second hydraulic port being disposed to supply the operating oil to the second hydraulic chamber, the second hydraulic port being provided independently from the first hydraulic port; and a tubular member fixed to a turbine-side lateral surface of the front cover, the piston being slidably supported by an outer peripheral surface of the tubular member, the first hydraulic chamber being configured between the front cover and the piston, the lock-up device further including a compartment plate being disposed between the first hydraulic chamber and the second hydraulic chamber, the compartment plate forming the second hydraulic chamber between the compartment plate and the piston, and the compartment plate being immovably fixed to the outer peripheral surface of the tubular member.

8. The lock-up device for the torque converter recited in claim 7, wherein the first hydraulic chamber and the second hydraulic chamber are sealed except for portions thereof with which the first hydraulic port extends to the second hydraulic port.

9. The lock-up device for the torque converter recited in claim 7, wherein the first hydraulic port and the second hydraulic port are holes from an inner peripheral side to an outer peripheral side of the tubular member.

10. The lock-up device for the torque converter recited in claim 7, wherein the second hydraulic chamber is disposed on an inner peripheral side than the clutch part.

* * * * *